No. 891,974. PATENTED JUNE 30, 1908.
W. BARROTT.
BAGGAGE ROPER.
APPLICATION FILED JAN. 11, 1908.
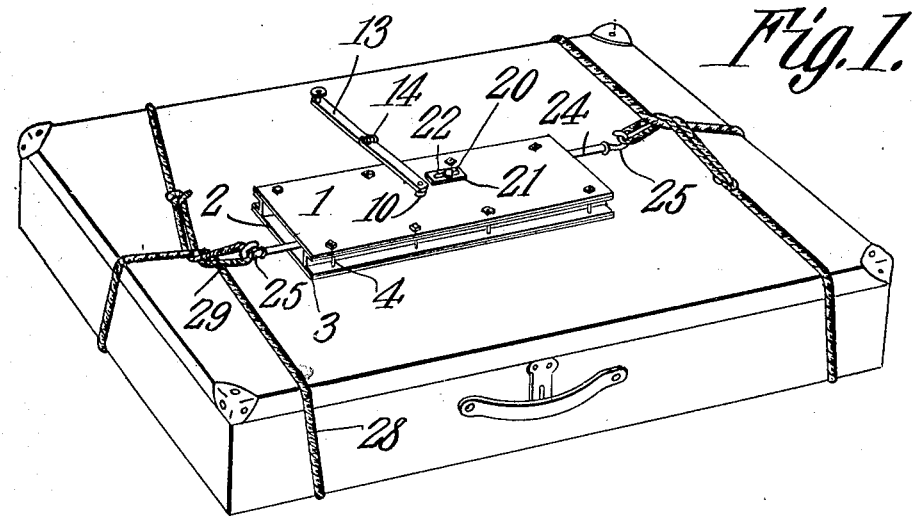
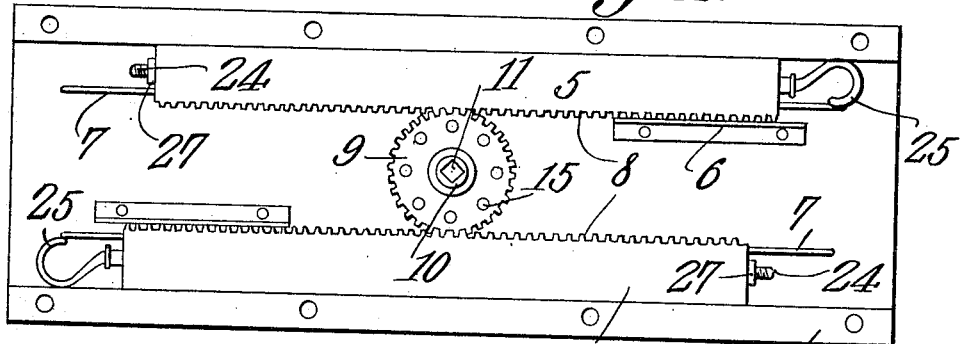
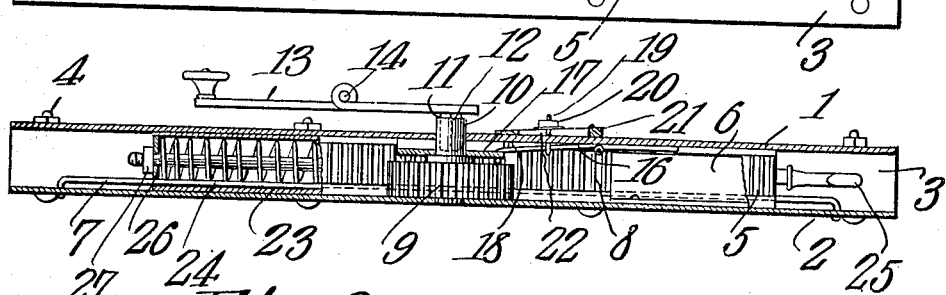
Witnesses
Inventor
William Barrott.
By
Attorneys

UNITED STATES PATENT OFFICE.

WILLIAM BARROTT, OF DE BEQUE, COLORADO.

BAGGAGE-ROPER.

No. 891,974.     Specification of Letters Patent.     Patented June 30, 1908.

Application filed January 11, 1908. Serial No. 410,467.

*To all whom it may concern:*

Be it known that I, WILLIAM BARROTT, a citizen of the United States, residing at De Beque, in the county of Mesa and State of Colorado, have invented a new and useful Baggage-Roper, of which the following is a specification.

This invention has relation to ropers for baggage and similar receptacles and it consists in the novel construction and arrangement of its parts as hereinafter described.

The object of the invention is to provide a device which may be used for the purpose of drawing the ends of a rope toward each other about a piece of baggage or a similar article preparatory to securing the ends of the said rope.

The roper consists primarily of a casing within which is mounted a pair of sleeves for longitudinal movement. Means is provided for moving the said sleeves simultaneously in opposite direction and means is provided for holding the said sleeves in fixed positions after they have been shifted. Hooks are resiliently mounted in the said sleeves and are adapted to engage loops made in the rope which is passed around the article.

In the accompanying drawing: Figure 1 is a perspective view of a piece of baggage with the roper located thereon. Fig. 2 is a plan view of the casing of the roper with one of the sides thereof removed, and Fig. 3 is a longitudinal sectional view of the roper.

The casing of the roper consists of the plates 1 and 2 which are spaced apart by the channel irons 3 located at the edges thereof and which are held in parallel relation to each other by the bolts 4. The sleeves 5 are mounted for longitudinal movement within the casing between the channel irons 3 and the guides 6. The rods 7 pass longitudinally through the sleeves 5 and are attached at their ends to the plate 2 and are adapted to limit the longitudinal movement of the said sleeves. The sleeves 5 are provided upon their inner faces or sides with the gear teeth 8. The gear wheel 9 is mounted upon the shaft 10 and meshes with the gear teeth 8 of both of the sleeves 5. The shaft 10 is journaled for rotation in the plates 1 and 2 and is provided at one end with a non-circular socket 11 which is adapted to receive a similar stud 12 mounted upon the crank handle 13. The said crank handle is provided with a hinge joint 14 which affords means for doubling the handle up when not in use whereby it will occupy but small space. The wheel 9 is provided with a series of perforations 15. The pawl 16 is hinged upon the under side of the plate 1 and is provided with an end which projects through the bridge 17 also supported by the plate 1. The spring 18 is attached at one end to the plate 1 and bears against the pawl 16 and is under tension to hold the end of the said pawl in the path of the perforations 15. The eye bolt 19 receives the pawl 16 and passes through the plate 1 and is provided with a nut 20 which rests upon the longitudinally movable wedge shaped plate 21 which is adapted to slide upon the outer surface of the plate 1 and which is provided with an elongated slot 22 which receives the bolt 19.

The springs 23 are housed within the sleeves 5 and the shanks 24 of the hooks 25 pass longitudinally through the said springs 23. The ends of the shanks 24 pass through the washers 26 and are screw threaded and are provided with the nuts 27. The springs 23 are under tension with a tendency to hold the hooks 25 toward the ends of the sleeves 5 and the tension of the said springs may be regulated by adjusting the nuts 27 upon the ends of the shanks 24.

The device is operated as follows: The rope 28 which is passed around the piece of baggage or similar article is provided at its ends with the loops 29. The hooks 25 are engaged in the said loops 29 and the crank handle 13 is applied to the shaft 10 by inserting the stud 12 in the socket 11. The crank handle is then turned and the shaft 10 and wheel 9 are correspondingly rotated. As the wheel 9 rotates the sleeves 5 are simultaneously moved in opposite directions and the loops 29 of the rope 28 are drawn together and when the rope is sufficiently tightened the said loops may be secured together by an additional piece of rope (not shown). As the said sleeves 5 are moved longitudinally the hooks 25 under the stress of the rope 28 are moved against the tension of the springs 23 so that both ends of the rope 28 are brought together under equal stress, the said springs 23 serving as equalizing agents in this respect. When the rope 28 has been sufficiently tightened the wedge 21 is moved longitudinally and the spring 18 forces the free end of the pawl 16 into engagement with one of the perforations 15 in the wheel 9. Thus, the parts are held in fixed relation while the ends of the rope 28 are being secured as above described.

Having thus described my invention, what I claim as new and desire to secure by Letters Patent is:

1. A roper comprising a casing, sleeves mounted for longitudinal movement therein, rods passing through the sleeves and being secured at their ends to the casing and adapted to limit the movement of the sleeves, means for moving the sleeves simultaneously in opposite directions and hooks carried by the sleeves.

2. A roper comprising a casing, sleeves mounted for longitudinal movement therein, means for simultaneously moving the sleeves in opposite directions, coil springs mounted in the sleeves, hooks slidably mounted upon the sleeves and being under tension of the said springs and means carried by the hooks for adjusting the tension of the springs.

3. A roper comprising a casing, sleeves mounted for longitudinal movement therein, hooks mounted upon the sleeves, a wheel engaging the sleeves and being provided with perforations, a pawl mounted upon the casing and having an end adapted to enter the perforations of said wheel, a spring for depressing said pawl, an eye bolt attached to the pawl, a nut mounted upon said bolt and a wedge interposed between said nut and the casing.

In testimony that I claim the foregoing as my own, I have hereto affixed my signature in the presence of two witnesses.

WILLIAM BARROTT.

Witnesses:
G. VAN HOOSEBEKE,
W. G. GAINES.